3,598,849
TRICYCLOHEXYLTIN ESTERS
Donald E. Bublitz, Concord, Calif., assignor to The Dow
Chemical Company, Midland, Mich.
No Drawing. Filed Sept. 20, 1968, Ser. No. 761,313
Int. Cl. C07f 7/22
U.S. Cl. 260—429.7      12 Claims

ABSTRACT OF THE DISCLOSURE

Novel tricyclohexyltin esters wherein the ester moiety is selected from ferrocenylcarbonyloxy, pyridylcarbonyloxy, phenoxyacetoxy, chlorophenoxyacetoxy, and phenylthioacetoxy. These compounds are useful as pesticides.

---

The present invention relates to novel and useful tricyclohexyltin esters. More specifically, the present invention is directed to tricyclohexyltin esters wherein the ester moiety is selected from ferrocenylcarbonyloxy, pyridylcarbonyloxy, phenoxyacetoxy, chlorophenoxyacetoxy, or phenylthioacetoxy. These compounds are representable by the following Formula I:

$$\left( \begin{array}{c} H_2C\text{---}CH_2 \\ H_2C \quad\quad CH_2 \\ H_2C\text{---}CH_2 \end{array} CH\text{---} \right)_3 Sn\text{---}O\text{---}\overset{O}{\underset{\|}{C}}\text{---}R \quad\quad (I)$$

In this and succeeding formulas, R represents ferrocenyl, 2-pyridyl, phenoxymethyl, chlorophenoxymethyl, or phenylthiomethyl.

In the present specification and claims, "chlorophenoxy" denotes a phenoxy group represented by the formula $$-O\text{---}\underset{}{\underset{}{\bigcirc}}\text{---}Cl_n$$

wherein $n$ is the integer 1, 2, 3, 4, or 5. Examples of such include phenoxy, 2,4,5-trichlorophenoxy, 2,3,5,6-tetrachlorophenoxy and pentachlorophenoxy.

The products of the present invention are crystalline solids or viscous oils at room temperature. They are useful as pesticides for the control of a wide variety of insect, arachnid, fungal and plant pests, for example, mosquitoes, flies, spiders, mites, ticks, the causative agents of rice blast and potato late blight, pigweeds, bindweed, and foxtail. They are particularly useful as acaricides for the control of mites and ticks.

The compounds of the present invention are prepared by reacting together tricyclohexyltin hydride and an acid selected from ferrocenoic, picolinic, phenoxyacetic, chlorophenoxyacetic, and phenylthioacetic acids. An inert, liquid reaction medium can be employed, if desired. Suitable media include toluene, hexane, tetrahydrofuran and the like. The reaction proceeds at temperatures at which hydrogen is evolved and conveniently at from about room temperature up to about 150° C. or more.

In the contacting and reacting of tricyclohexyltin hydride with the acid reactant to prepare the products of Formula I, the reaction consumes the two reactants in a mole ratio of 1:1. Although some of the desired product is prepared by contacting the respective reactants in any molecular proportion, it is preferred to employ the requisite molecular amounts of each.

In carrying out the reaction, the tricyclohexyltin hydride and acid are contacted with one another in liquid reaction medium, if desired, and in any convenient order and manner. The ensuing reaction is allowed to proceed within the given temperature range for a period of time sufficient to complete the reaction. Upon completion of the reaction, the reaction mixture is conventionally processed to recover and purify, if desired, the product. Such processes include, for example, filtration, decantation, recrystallization and chromatography.

The following examples illustrate the present invention but are not to be construed as limiting.

EXAMPLE 1

Ferrocenylcarbonyloxytricyclohexyltin

Tricyclohexyltin hydride (7.4 grams; 0.020 mole) is dispersed in 500 milliliters of dry tetrahydrofuran with stirring at room temperature. Ferrocenoic acid (4.6 grams; 0.020 mole) is added to the resultant dispersion with stirring and at room temperature over a period of 2 minutes. The reaction mixture is then evaporated to dryness by heating it at a temperature of 100° C. for 18 hours. The resultant mass is then cooled and recrystallized from hexane to obtain the ferrocenyl carbonyloxytricyclohexyltin product as an orange solid melting at 160° C. The compound is identified from its infrared spectrum and nuclear magnetic resonance data.

EXAMPLE 2

2-pyridylcarbonyloxytricyclohexyltin

The procedure set forth in Example 1 is repeated reacting together 7.4 grams (0.020 mole) of tricyclohexyltin hydride and 2.5 grams (0.020 mole) of picolinic acid at a temperature of 65° C. for three hours to obtain the 2-pyridylcarbonyloxytricyclohexyltin product as a crystalline solid melting at from 148° to 152° C. The infrared spectrum and nuclear magnetic resonance data identify the compound.

EXAMPLE 3

Phenoxyacetoxytricyclohexyltin

A mixture of 3.69 grams (0.0100 mole) of tricyclohexyltin hydride and 1.5 grams (0.010 mole) phenoxyacetic acid are mixed together with stirring over a 10 minute period at room temperature. The mixture is then heated up to and maintained at a temperature of 100° C. for two hours. The reaction mass is then cooled and recrystallized from hexane to obtain the phenoxyacetoxytricyclohexyltin product as a white solid melting at 72° C. The assigned structure is supported by the infrared spectrum and nuclear magnetic resonance data.

EXAMPLE 4

Phenylthioacetoxytricyclohexyltin

Tricyclohexyltin hydride (3.69 grams; 0.0100 mole) and 1.7 grams (0.010 mole) of phenylthioacetic acid are reacted together in the manner described in Example 3 to obtain, after a 20 hour reaction at a temperature of 100° C., the phenylthioacetoxytricyclohexyltin product as a colorless viscous oil having a molecular weight of 519.4. The compound is identified by its infrared spectrum and nuclear magnetic resonance data.

EXAMPLE 5

2,4-dichlorophenoxyacetoxytricyclohexyltin

By reacting 7.4 grams (0.020 mole) of tricyclohexyltin hydride and 4.4 grams (0.020 mole) of 2,4-dichlorophenoxyacetic acid together at a temperature of 100° C. for 8 hours in accordance with the procedure described in Example 3, there is obtained the 2,4-dichlorophenoxyacetoxytricyclohexyltin product as a white solid which melts at 58° C. The infrared spectrum and nuclear magnetic resonance data are in accord with the assigned structure.

In procedures analogous to the foregoing and in accordance with the method of the present invention pentachlorophenoxyacetoxytricyclohexyltin (molecular weight 615.5) is prepared by reacting together tricyclohexyltin hydride and pentachlorophenoxyacetic acid and 2,3,5-trichlorophenoxyacetoxytricyclohexyltin (molecular weight 546.6) is prepared by reacting together tricyclohexyltin hydride and 2,3,5-trichlorophenoxyacetic acid.

The compounds of the present invention are useful as pesticides for the control of a wide variety of household and agricultural pests such as insect, arachnid, fungal, and plant pests as, for example, mites, ticks, beetles, worms, flies, *Bacillus subtilis,* bread mold fungus, pigweeds, Moneywort, and Daphnia. For such use, the unmodified compounds can be employed. Alternatively, the compounds can be dispersed on an inert finely divided solid to prepare dust compositions. The latter dust compositions can be dispersed in water with or without the aid of a wetting agent and the resulting aqueous dispersions employed as sprays. In other procedures, the compounds can be employed as a constituent in edible oils or in other oils or solvents, or as a constituent in solvent-in-water or water-in-solvent emulsions or dispersions which can be employed as sprays, drenches or washes. Good results are obtained with methods employing and compositions containing pesticidal amounts of one or more of the compounds hereof. Generally, these amounts range from about 0.5 to about 5000 parts per million of one or more of the compounds.

In representative operations, each of phenoxyacetoxytricyclohexyltin, 2,4-dichlorophenoxyacetoxytricyclohexyltin, phenylthioacetoxytricyclohexyltin, ferrocenylcarbonyloxytricyclohexyltin, and 2-pyridylcarbonyloxytricyclohexyltin give 100 percent controls and kills of two-spotted spider mites when such are separately contacted with aqueous solutions containing one of the named compounds, as the sole toxicant, at a concentration of 100 parts per million by weight.

In further operations, each of phenoxyacetoxytricyclohexyltin and phenylthioacetoxytricyclohexyltin gives good controls and kills of housefly and Southern armyworm, when each of such are separately contacted with aqueous solutions containing one of the named compounds, as the sole toxicant, at a concentration of 500 parts per million parts by weight.

In still additional operations, each of 2,4-dichlorophenoxyacetoxytricyclohexyltin, phenylthioacetoxytricyclohexyltin, and ferrocenylcarbonyloxytricyclohexyltin gives a 100 percent control adn kill of *Staphylococcus aureus* when such organism is separately contacted with compositions containing one of the named compounds at a concentration of 500 parts per million by weight.

The acids employed in the preparation of the compounds of the present invention are known and can be prepared in conventional methods. Tricyclohexyltin hydride can be prepared by reducing tricyclohexyltin chloride with lithium aluminum hydride preferably in organic reaction medium and at temperatures of from about minus 10° to about 110° C.

What is claimed is:
1. The compound corresponding to the formula

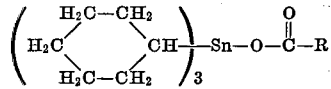

wherein R represents ferrocenyl, phenoxymethyl, chlorophenoxymethyl, or phenylthiomethyl.

2. The compound claimed in claim 1 wherein R is ferrocenyl.

3. The compound claimed in claim 1 wherein R is ferrocenyl or phenoxymethyl.

4. The compound claimed in claim 1 wherein R is ferrocenyl or 2,4-dichlorophenoxymethyl.

5. The compound claimed in claim 1 wherein R is ferrocenyl or phenylthiomethyl.

6. The compound claimed in claim 1 wherein R is phenoxymethyl.

7. The compound claimed in claim 1 wherein R is 2,4-dichlorophenoxymethyl.

8. The compound claimed in claim 1 wherein R is phenylthiomethyl.

9. The compound claimed in claim 1 wherein R is phenoxymethyl or 2,4-dichlorophenoxymethyl.

10. The compound claimed in claim 1 wherein R is phenoxymethyl or phenylthiomethyl.

11. The compound claimed in claim 1 wherein R is 2,4-dichlorophenoxymethyl or phenylthiomethyl.

12. The compound claimed in claim 1 wherein R is chlorophenoxymethyl.

References Cited
UNITED STATES PATENTS 3,264,177   8/1966   Kenaga _____ 260—429.7X

OTHER REFERENCES

Eaborn et al.: "Chemical Abstracts," vol. 55, 1961, col. 15391b.

Abstract of "Journ. Chem. Soc.," 1961, pp. 542–7.

ALEX MAZEL, Primary Examiner

J. H. TURNIPSEED, Assistant Examiner

U.S. Cl. X.R.

260—270; 424—245, 287